United States Patent
Ozaki et al.

(10) Patent No.: US 6,676,147 B2
(45) Date of Patent: Jan. 13, 2004

(54) AIR BAG DEVICE

(75) Inventors: Toru Ozaki, Osaka (JP); Kenji Shibayama, Osaka (JP); Kazuaki Bito, Osaka (JP); Takeshi Yamaji, Osaka (JP); Hidehito Sogi, Osaka (JP); Takashi Sasaki, Osaka (JP); Yoshinori Mihara, Osaka (JP)

(73) Assignee: Toyoda Gosei Co., Ltd., Aichi (JP)

( * ) Notice: Subject to any disclaimer, the term of this patent is extended or adjusted under 35 U.S.C. 154(b) by 23 days.

(21) Appl. No.: 09/980,371

(22) PCT Filed: Nov. 28, 2001

(86) PCT No.: PCT/JP01/03058
§ 371 (c)(1),
(2), (4) Date: Mar. 12, 2002

(87) PCT Pub. No.: WO01/81127
PCT Pub. Date: Nov. 1, 2001

(65) Prior Publication Data
US 2003/0006595 A1 Jan. 9, 2003

(30) Foreign Application Priority Data
Apr. 25, 2000 (JP) .......................... 2000-124868
Nov. 6, 2000 (JP) .......................... 2000-338225

(51) Int. Cl.[7] .............................................. B60R 21/26
(52) U.S. Cl. ............................................ 280/240; 280/742
(58) Field of Search ................................ 280/740, 736, 280/739, 741, 742

(56) References Cited

U.S. PATENT DOCUMENTS

| 5,458,364 A | * | 10/1995 | Mueller et al. | 280/728.2 |
| 5,468,012 A | | 11/1995 | Mihm | |
| 5,671,945 A | | 9/1997 | Rhule et al. | |
| 5,873,598 A | * | 2/1999 | Yoshioka et al. | 280/740 |
| 5,887,891 A | | 3/1999 | Taquchi et al. | |
| 5,988,677 A | * | 11/1999 | Adomeit et al. | 280/740 |
| 6,029,996 A | * | 2/2000 | Yoshioka et al. | 280/740 |

FOREIGN PATENT DOCUMENTS

| JP | 9-48318 | 2/1997 |
| JP | 2667964 | 6/1997 |
| JP | 9-263209 | 10/1997 |
| JP | 10006913 | 1/1998 |

* cited by examiner

Primary Examiner—Paul N. Dickson
Assistant Examiner—Faye Fleming
(74) Attorney, Agent, or Firm—Knobbe Martens Olson & Bear, LLP

(57) ABSTRACT

In an airbag device (10) wherein within a casing (12) opening upwardly an inflator (16) and an airbag (14) are housed at its bottom part and the opening side, respectively, a cylindrical diffuser (18) surrounding the outer circumference of the inflator (16) is provided, which has a partition wall (40) projecting toward the opening side of the casing and partitioning an airbag-housing space into a forward side and a rearward side relative to the vehicle, in which to house the airbag (14) dividedly, and a lip portion (32) of the airbag (14) is superposed downwards of the diffuser (18) thereby to lock the bottom part of the diffuser (18) to the bottom surface of the casing (12). Thus, it is easy, albeit compart, to control the deployment behavior of the airbag and excellent in workability of assembling the airbag in the casing.

12 Claims, 14 Drawing Sheets

AIR BAG DEVICE

TECHNICAL FIELD

This invention relates to an airbag device, which is a protecting device for a seat occupant of a vehicle or the like.

BACKGROUND ART

An airbag device is, in general, composed of a casing arranged at the front part in the indoor room of a vehicle such as an instrument panel or a center of a steering wheel, an airbag housed in the casing in a folded fashion, and an inflator as a gas generator and constructed so that the airbag may be expanded and deployed toward the occupant by the gas the inflator generates upon impingement of the vehicle, thereby receiving the occupant's body.

With the recent demand of a more lightweight vehicle, the airbag device is required to be compactified. The more compactified the casing, however, the more difficult becomes the work of assembling the airbag in the casing. In particular, with a conventional typical airbag device, a rectangular lip portion of the airbag is fixed to the inside wall of the opening marginal portion of the casing with a bag retainer, etc. and hence, the smaller the open area of the casing is made, the more difficult the work of fixing the airbag to the casing.

Conventional airbag devices are classified, according to the way of arrangement of housing the inflator and airbag in the casing, into a series arrangement type as shown in FIG. 13 and a parallel arrangement type as shown in FIG. 14.

In the series arrangement type of airbag device as illustrated in FIG. 13, in a casing 101 opening upwards there are housed and disposed a columnar inflator 102 at its bottom side and an airbag 103, at its upper opening side. Since the airbag 103 and the inflator 102 are arranged upwards and downwards, it is possible to make the opening area of the casing 101 small, but the entirety of the airbag 103 is forced out by the gas given off from the inflator 102 and yet controlling its deployment behavior is not easy.

According to the parallel arrangement type of airbag device shown in FIG. 14, in the casing 101 opening upwardly, the columnar inflator 102 is arranged at the frontward side of the vehicle, namely counter-occupant side whereas the airbag 103 is housed at the rearward side of the vehicle, namely the occupant side. In this case, the inflator 102 and the airbag 103 are arranged fore and aft, so that it is possible to deploy the airbag from its upper side by the gas generated from the inflator 102. However, a door covering the opening of the casing 101 is indispensably large because of a large opening area of the casing 101 and thus there are many restrictions in mounting on the vehicle.

Another arrangement type of one is also proposed as shown in FIG. 15, wherein the casing 101 opening upwardly is provided, at its central part relative to the fore-and-aft direction, with a concave portion 104 on which to dispose the inflator 102, a diffuser 105 is provided so as to cover the inflator 102 arranged within the concave portion 104, and the airbag 103 is folded and accommodated fore and aft relative to the diffuser 105. With this type, because the inflator 102 is arranged in the center, it is difficult to control the deployment behavior of the airbag 103 and besides owing to a large opening area of the casing 101 the door covering the opening is also large, which causes many restrictions in mounting on the vehicle.

Aside from above, another type of airbag device is also known in the art, which is constructed so that a diffuser for adjusting and regulating the gas flows generated by the inflator is formed in a cylindrical form to surround the outer circumference of the inflator in order to facilitate the work of securing the airbag to the casing and arranged within the lip portion of the airbag thereby to engage the airbag with the diffuser within the casing.

FIG. 16 is a sectional view of a prior art airbag device of this kind. In a casing 201, a generally columnar inflator 202 and a folded airbag 203 are accommodated. The inflator 202 is loaded in a columnar diffuser 204 and locked through a cap 205 to the one of opposed sidewalls of the casing 201 by means of a bolt 206 and nut 207. The airbag 203 is attached at its lip portion 208 to wrap the outer circumference of the diffuser 204, thereby being engaged within the casing 201. The airbag 203 has right-hand and left-hand openings whose marginal portions 209, 210 are pinched in clearances X between the edges of the diffuser 204 and the sidewalls of the casing 201, which are in turn made small by the locking of the inflator 202 with the aid of the bolt 206 and nut 207 to prevent the gas from leaking.

With the construction shown in FIG. 16, however, the gas from a gas blowoff part 211 provided at one end of the inflator 202 is directly blown to the clearance X, so that it is difficult to avoid firmly the gas leakage.

FIG. 17 is a sectional view showing another known airbag device of this kind. Here, the opening marginal portions 209, 210 of the airbag 203 are not pinched in the clearances X between the diffuser 204 and the sidewalls of the casing 201, but the clearances X are closed by pressing the edge of the diffuser 204 with the cap 205.

However also in this construction shown in FIG. 17, the gas is likely to leak as a result of deformation of the end of the diffuser 204 owing to a gas pressure from the gas blowoff part 211. Furthermore since the opening marginal portion 209 of the airbag 203 is not pinched, the gas is likely to leak also from a clearance between the opening margin 209 and the perimeter of the diffuser 204.

In view of the prior art problems and difficulties described above, this invention has been made and therefore a first object of this invention is to provide an airbag device, with which it is easy to control the deployment behavior of the airbag and which is superior in workability in assembling the airbag in the casing.

A second object of this invention is to prevent the inflator gas from leaking outside, in an airbag device such that the airbag is engaged within the casing with a cylindrical member such as a diffuser in order to improve the workability of assembling the airbag in the casing.

DISCLOSURE OF INVENTION

A first invention for solving the first object is an airbag device comprising a casing having an opening, a generally columnar inflator housed in the casing at its bottom side, an airbag folded and housed in the casing at its opening side and a cylindrical member surrounding the outer periphery of the inflator and having at its peripheral surface holes for blowing off gas emitted by the inflator, wherein the cylindrical member is provided with a partition wall projecting toward the opening side of the casing to compart the space for housing therein the airbag into two sides, the airbag is divided and housed in the one side and the other side of the partition wall, the airbag has a lip portion extending to the bottom part of the cylindrical member so that the outer periphery of the cylindrical member is surrounded by the airbag, the bottom part of the cylindrical member is locked to the bottom surface of the casing to form a locked part, with which the lip portion of the airbag is engaged to fix the airbag to the casing.

According to this airbag device, the bottom part of the cylindrical member is locked to the bottom surface of the casing in the state that the cylindrical member is arranged inside the lip portion of the airbag, whereby it is possible to fix the airbag on the bottom surface of the casing. Consequently, the airbag device is excellent in the workability of assembling the airbag and the cylindrical member in the casing and advantageous particularly in case where the opening area of the casing is small.

This airbag device falls under a series arrangement type wherein the airbag and the inflator are arranged upwards and downwards in the casing, and hence the opening area of the casing can be made small. Moreover the diffuser for controlling the gas flow to the airbag is provided with the partition wall, by which the airbag is divided into two and housed and hence, it is possible to control the deployment behavior of the airbag despite a series arrangement type.

Thus the abovementioned airbag device is compact, yet the deployment behavior of the airbag can be controlled easily and an excellent workability of assembling the airbag in the casing is achieved.

In the airbag device of this invention, the cylindrical member may be provided at its bottom part with a locking projection and the lip portion of the airbag and the bottom surface of the casing may be formed with through-holes through which to insert the locking projection, in order that the locking projection of the cylindrical member is inserted into the through-hole of the airbag, and further into the through-hole of the casing thus engaging both, thereby fixing the bottom part of the cylindrical member to the bottom surface of the casing.

In this case, the airbag can be assembled in the casing in the state that the airbag is locked to the cylindrical member by catching the lip portion of the airbag on the locking projection of the cylindrical member. With the airbag thus assembled, the lip portion is engaged with the locking projection of the cylindrical member.

In the airbag device of this invention, it is preferred that the casing be open nearly upwards and arranged within an instrument panel of a vehicle so that the axial direction of the inflator is oriented in the width direction of the vehicle, the space for housing therein the airbag be comparted for and aft by the partition wall of the cylindrical member and the airbag be divided and housed into a frontward side and a rearward side of the vehicle relative to the partition wall in a folded state, the folded part of an upper bag in a deployed form of the airbag be housed in the frontward side of the vehicle relative to the partition wall while the folded part of a lower bag in a deployed form of the airbag be housed in the rearward side, and the holes on the peripheral surface of the cylindrical member be arranged so that the opening area of the part of holes located at the frontward side of the partition wall is larger than the opening area of the part of holes located at the rearward side of the partition wall.

By that construction, it is possible to blow out more gas from the frontward side of the partition wall to deploy rapidly the folded part of the upper bag followed by deploying rapidly the folded part of the lower bag and to control the deployment behaviors of the airbag.

Here, the holes of the peripheral surface of the cylindrical member may be provided only at the frontward side of the vehicle relative to the partition wall, whereby it is possible to achieve more rapidly the deployment of the upper bag housed in the frontward side.

In this embodiment, it is further preferred that the upper bag of the airbag be folded in a bellows form and the lower bag in a roll form. Then it is possible to achieve a more rapid deployment of the upper bag.

A second invention for solving the second object consists in an airbag device comprising an airbag, an inflator assuming a generally columnar form and having at its axially end a gas blowoff part, a casing housing therein the airbag and the inflator and having an opening through which to expand out the airbag, and a cylindrical member surrounding the outer circumference of the inflator and having at its peripheral surface holes for blowing off gas emitted from the inflator into the airbag, wherein the cylindrical member is disposed within a lip portion of the airbag and arranged between a first sidewall and a second sidewall of the casing opposed to each other, the inflator loaded in the cylindrical member is locked, at its one end constituting a gas blowoff part, to the first sidewall and, at its other end, to the second sidewall, the airbag is engaged within the casing with the cylindrical member arranged inside it, the gas blowoff part of the inflator is covered with a gas-restraining wall projecting from the first sidewall between the gas blowoff part and the cylindrical member.

In the second airbag device, at the one end of the inflator having the gas blowoff part, the gas-restraining wall is provided in a manner projecting from the first sidewall of the casing thereby covering the radial outside of the gas blowoff part. On account of this, the gas blown out radially outwardly is prevented from blowing directly to the clearance between the first sidewall of the casing and the edge surface of the cylindrical member. Therefore gas leakage out of the clearance can be avoided.

Because of the gas-restraining wall it is possible to suppress that the end of the cylindrical member deforms owing to the pressure of gas blown out radially outwardly from the gas blowoff part and the gas leakage is diminished.

Furthermore where the lip portion of the airbag has openings for securing both ends of the inflator to the sidewalls of the casing and marginal portions around the openings are pinched between the sidewalls of the casing and the edge surfaces of the cylindrical member, it is possible to protect the opening marginal portions of the airbag from the heat of the gas by means of the gas-restraining wall.

When the cylindrical member is subjected to a force of shifting it in the deploying direction by the deployment of the airbag, the gas-retraining wall provided within the cylindrical member can suppress the shifting.

By the gas-restraining wall, it is additionally possible to change the flow of the gas blown off in radial directions out of the gas blowoff part, thereby to flow the gas along the axial direction of the inflator. Because of this it is possible to adjust the gas flows blown off from the holes of the peripheral surface of the cylindrical member so that the gas flows are equalized in the axial direction of the inflator and hence, the control of deployment of the airbag can be advantageously performed.

The gas-restraining wall is not limited to that in the aforementioned example, which is provided in the entire periphery of the gas blowoff part. For example, the gas-restraining wall may be provided only in nearly a half area the opening area of the casing in the peripheral direction of the gas blowoff part. From the viewpoints of suppressing the deformation of the casing and cylindrical member upon deployment of the airbag and exhibiting the aforementioned effect more sufficiently, it is preferred to provide the gas-restraining wall over the circumferentially entire area of the gas blowoff part.

It is preferred that the gas-restraining wall project in a manner covering more than a half the gas blowoff part in the axial direction. In other words, the gas-restraining wall is preferred to project to cover more than half the axial opening area for a plurality of gas blowoff outlets provided on the peripheral surface of the gas blowoff part. More preferably, the gas-restraining wall projects to cover the axial entirety of the gas blowoff part, from the aspect of exhibiting the aforementioned effects more sufficiently.

The gas-restraining wall may be provided either as the first sidewall itself of the casing or separately from it. In case where it is separately provided, for example, a circular opening is formed in the first sidewall, and the inflator is attached at its one end to close the opening and secured to the sidewall through a cap, to which the gas-restraining wall may be provided.

In the second airbag device, the lip portion of the airbag may be provided with openings for securing both ends of the inflator to corresponding sidewalls of the casing, the marginal portion around the opening being pinched between the gas-restraining wall and the cylindrical member. In this case, it is possible to suppress effectively the gas leakage from the clearance between the cylindrical member and the first sidewall of the casing and concurrently to protect the opening marginal portion of the airbag from the heat of gas.

In accordance with this invention, it is more effective to combine the construction of the first airbag device and the construction of the second airbag device in performing the deployment control of the airbag. Stated another way, by combining both constructions, more particularly, the partition wall and the gas-restraining wall which are concerned with the deployment control of the airbag, the gas flows blown out of the cylindrical member can be adjusted so as to be equalized in the axial direction of the inflator and the resulting adjusted gas flows can be supplied to the airbag divided by the partition wall extending in the axial direction of the inflator and housed in a folded state, so that a more effective deployment control of the airbag is possible.

BEST MODE FOR CARRYING OUT THE INVENTION

Figure 1:
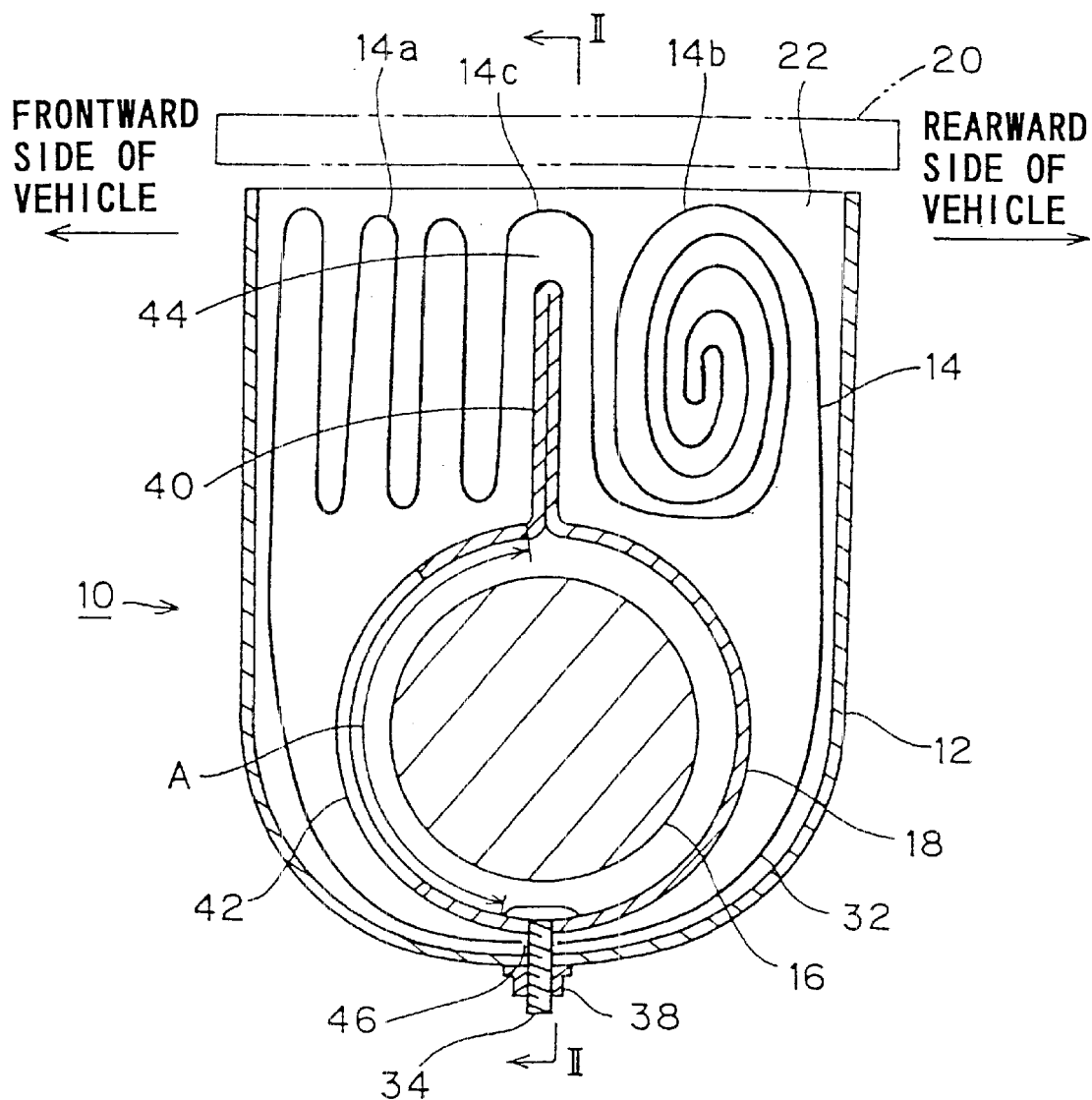
FIG. 1 is a longitudinal sectional view of an airbag device relating to a first embodiment of this invention.
Figure 2:
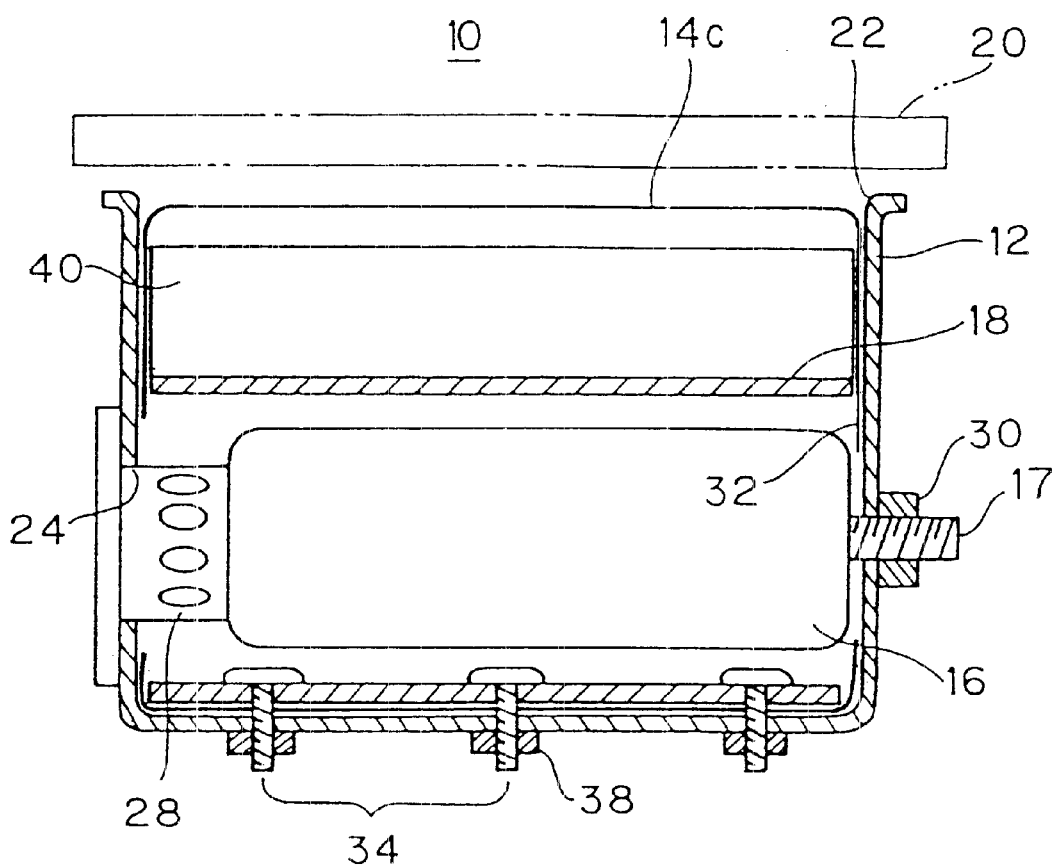
FIG. 2 is a sectional view taken along II—II line of FIG. 1.
Figure 3:
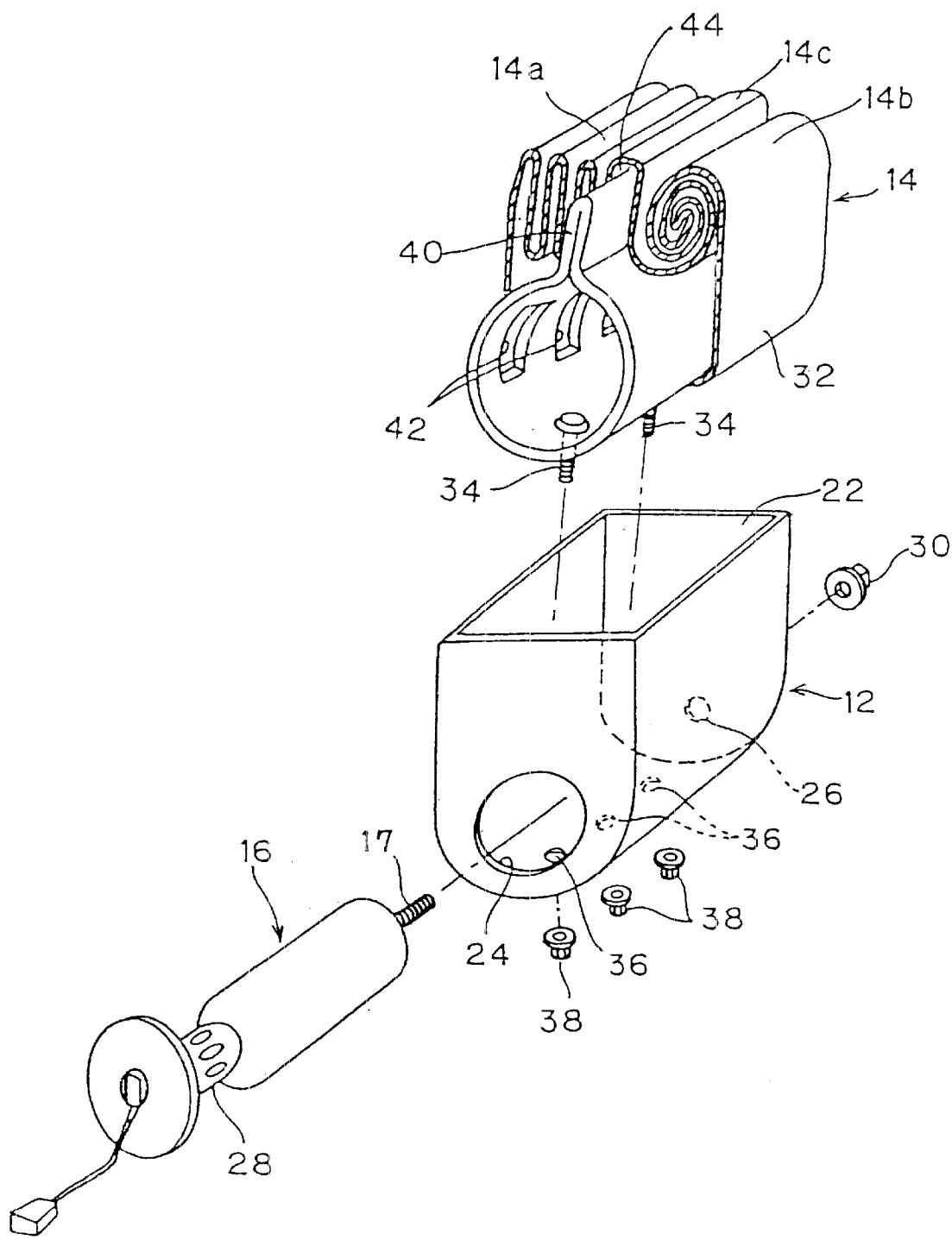
FIG. 3 is an exploded view in perspective of the aforementioned airbag device.
Figure 4:
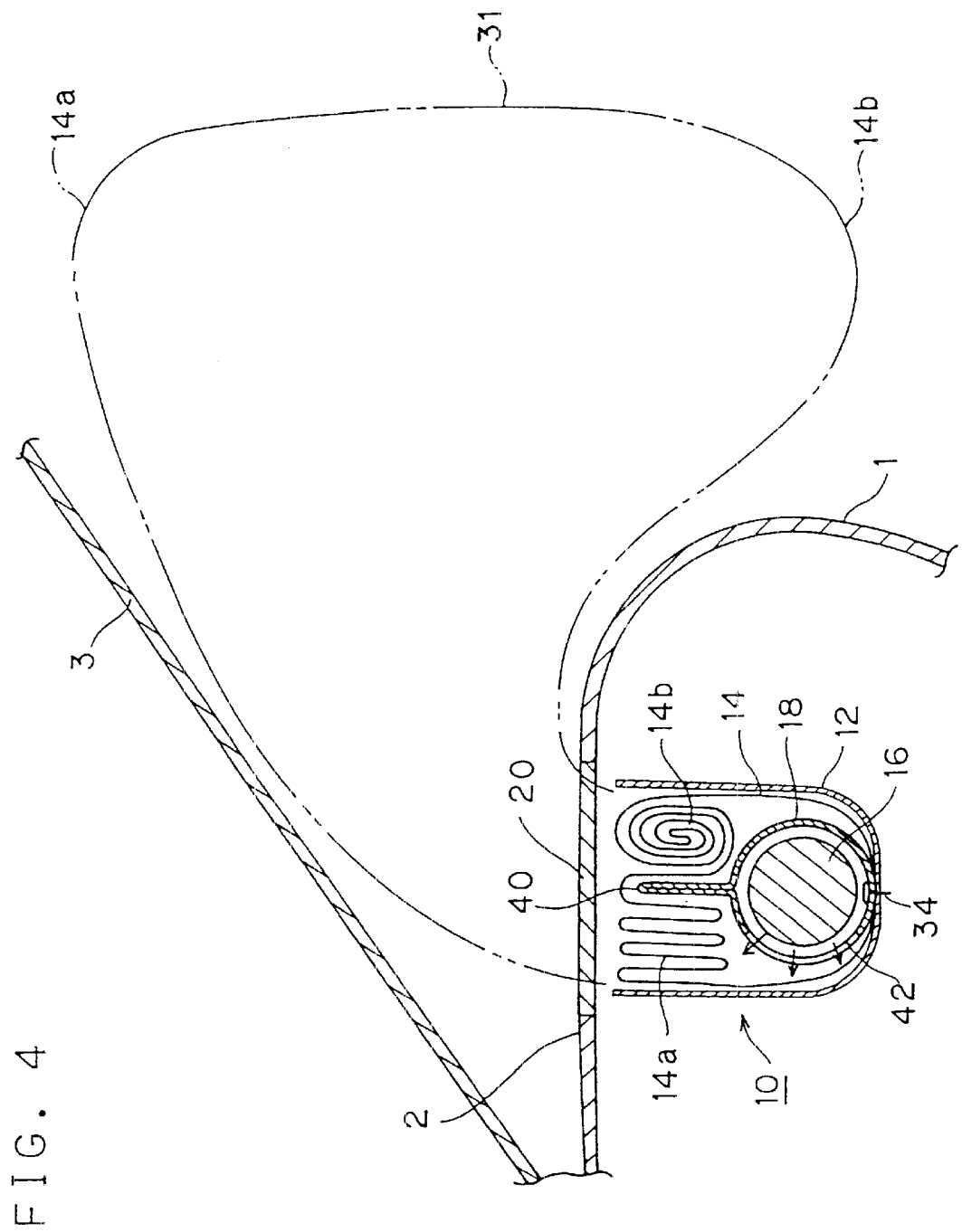
FIG. 4 is a sectional view of the preceding airbag device showing the state it is installed in a vehicle.

An airbag device 10 pertaining to a first embodiment of this invention will be described with reference to FIGS. 1 to 4.

This airbag device 10 is an airbag device for an assistant driver's seat of an automobile and installed within its instrument panel 1 in front of the assistant driver's seat. It is made up of a casing 12 arranged at a rearward position of an upside portion 2 of the instrument panel 1 and opening upwardly, an airbag 14 housed in the casing 12 in a folded state, an inflator 16 of a generally columnar form, which is a gas generator, a diffuser 18 for controlling the flow of gas generated from the inflator 16, which is a cylindrical member, and a door 20 covering the upside opening of the casing 12. And the airbag device is constructed so that upon collision of the vehicle, the airbag 14 may deploy in the rearward direction of the vehicle thereby receiving the occupant's body. The reference numeral 3 designates a windshield.

The casing 12 is a box-shaped container made of metal having a rectangular opening 22 at its upside and a curved surface at its bottom, and assumes a rectangular form, elongate in the width direction of the vehicle, in a horizontal section and a generally U-form in a longitudinal section. At its sidewalls opposed to each other in the width direction of the vehicle, the casing 12 has an inlet hole 24 for inserting therethrough the inflator 16, on the one hand, and a through-hole 26 for fitting a bolt 17 at the end of the inflator 16 after insertion, on the other hand.

The inflator 16 is accommodated in the casing 12 at its bottom part with its axial direction oriented in the width direction of the vehicle. The inflator 16 is a small-sized hybrid type one, and provided at its axial one end with a gas blowoff part 28 and at its other end with the bolt 17, which is to be fitted into the through-hole 26 of the casing 16 followed by being secured with a nut 30.

The airbag 14 is a bag body three-dimensionally sewed from a woven fabric or the like of a synthetic fiber and comprises a main body 31 for receiving the passenger and a lip portion 32 admitting therefrom the gas from the inflator 16 and assuming a rectangular form conforming to the opening form of the casing 12. The airbag 14 is engaged at the lip portion 32 with the casing 12 and the main body 31 is folded and accommodated above the inflator 16, namely at the upside opening side of the casing 12.

The diffuser 18 is a cylindrical metal member surrounding the entirety of the outer circumference of the inflator 16 and secured to the bottom surface of the casing 12. More particularly, at the bottom of the diffuser 18, a plurality of locking bolts 34 (three pieces in this embodiment) are provided rigidly with it so as to project downwardly. At the bottom surface of the casing 12 through-holes 36 are provided to fit the locking bolts 34, which are in turn fastened with nuts 38 thereby fixing the diffuser 18 to the casing 12.

The diffuser 18 is provided with a partition wall 40 projecting toward the opening 22 side of the casing to compart the space, the airbag 14 is housed, fore and aft. The partition wall 40 is a spacer wall extending from the top of the cylindrical diffuser 18 to the vicinity of the opening 22 of the casing 21 and formed over the whole width of the casing 12. The partition wall 40 is formed as a one-piece body together with the cylindrical part of the diffuser 18 by press working.

The cylindrical part of the diffuser 18 is provided with a plurality of blowoff holes 42 for supplying the gas blown off from the blowoff part 28 of the inflator 16 into the airbag 14. The blowoff holes 42 are, in this embodiment, provided only at the frontward side of the vehicle relative to the partition wall 40. More specifically, a plurality of the blowoff holes 42 assuming an elongated rectangular form are provided on a cylindrical wall only at the frontward side of the vehicle relative to the partition wall 40 so as to be spaced apart a predetermined distance from one another. The provision area A of the blowoff holes 42 is a cylindrical wall part ranging from the base part of the partition wall 40 at the frontward side of the vehicle relative to the partition wall 40 to the fixing part of the bolts 34, and in this area A the blowoff holes may be arranged appropriately (cf. FIG. 1).

The airbag 14 arranged above the diffuser 18 is housed in a folded state dividedly into a frontward housing space of the vehicle and a rearward housing space of the vehicle comparted by the partition wall 40 of the diffuser 18. In the frontward housing space of the vehicle relative to the partition wall 40, the folded part of an upper bag part 14a in a deployed form of the airbag 14 is housed whereas in the rearward housing space, the folded part of a lower bag part 14b in a deployed form of the airbag 14 is housed (cf. FIG. 4).

Here, the upper bag part 14a is folded in a bellows form and the lower bag part 14b in a roll form. More specifically, the airbag 14 is developed in vertical direction while folding its lateral sides to obtain an elongate folded body having nearly the same width as the width of the casing 12, and of the folded body, the upper bag part 14a is folded together into a bellows form whereas the lower bag part 14b is wound in a roll form.

A bag part 14c connecting the two folded parts 14a, 14b is not folded in the vertical direction of the airbag 14, and rearwards of the bag part 14c there is provided an insertion part 44 for inserting the partition wall 40.

The lip portion 32 of the airbag 14 extends in a manner wrapping the outer circumference of the diffuser 18 from upward to the bottom part of the diffuser 18, and the diffuser 18 is placed within the airbag 14. The lip portion 32 is provided with a plurality of insertion holes 46, through which the locking bolts 34 are inserted and the bolts 34 are fixed to the bottom surface of the casing 12 with the nuts 38, whereby the airbag 14 is secured to the bottom surface of the casing 12 through the lip portion 32.

In assembling the airbag device 10, first, the diffuser 18 is placed inside the lip portion 32 of the airbag 14 to sew it, the locking bolts 34 of the diffuser 18 are inserted through the insertion holes 46 of the airbag and the airbag 14 is folded in the manner described above. Thus the airbag 14 and the diffuser 18 are combined and at that time, the partition wall 40 of the diffuser 18 is inserted in the insertion part 44 of the airbag 14. Thereafter the airbag 14 and the diffuser 18 are placed into the casing 12 from the opening 22, and the locking bolts 34 of the diffuser 18 are inserted through the insertion holes 36 on the bottom surface of the casing 12 to be secured with the nuts 38. In this way, the diffuser 18 is secured to the bottom surface of the casing 12 and concurrently, the lip portion 32 of the airbag 14 is pinched between the diffuser 18 and the bottom surface of the casing 12, being engaged with the bolts 34. Consequently, the airbag 14 is fixed to the casing 12. Then the inflator 16 is placed into the casing 12 through the insertion hole 24 and secured at the top bolt 17 with the nut 30 whereby the airbag device 10 is fabricated.

In the airbag device 10 according to the embodiment as constructed above, when the gas is given off from the inflator 16 upon collision of the vehicle, the gas is blown off from the diffuser 18 at the forward side of the partition wall 40, and the folded part of the upper bag part 14a in a bellows form, housed above the diffuser, is deployed rapidly to form an occupant restraining surface and then the folded part of the lower bag part 14b in a roll form, housed at the rearward side of the vehicle, is deployed, whereby it is possible to achieve a deployment behavior of the airbag 14 advantageous for the occupant restraining characteristics.

Thus the airbag device 10 is able to control the deployment behavior of the airbag 14 and yet falls under a series arrangement type, wherein the airbag 14 and the inflator 16 are arranged upwards and downwards in the casing 12, and hence it is possible to make the opening area of the casing 12 small. Consequently, it is possible to provide such an airbag device that is high in design freedom by making the opening area of the casing 12 small while controlling the deployment behavior of the airbag 14.

Moreover this airbag device 10 is superior in workability of assembling the airbag 14 and the diffuser 18 in the casing 12, since the airbag 14 is fixed to the bottom surface of the casing 12 by securing the bottom part of the diffuser 18 to the bottom surface of the casing 12, with the diffuser 18 placed within the airbag 14. The airbag 14 suffices to be locked to the casing 12 at only one place of the bottom part of the casing and hence a weight reduction can be achieved by the curtailment of component pieces required in comparison with the conventional attachment construction where the airbag is fixed to the marginal portion around the opening of the casing. Since the airbag is not fixed to the opening of the casing, at its inside, the opening area of the casing can be made smaller and the assembling work of the airbag is simple and easy even in case where the opening area is small.

In this embodiment described above, the upper bag part 14a and the lower bag part 14b are folded in a bellows form and a roll form, respectively, but another folding structures may also be adopted depending upon the shape of the airbag 14, the constituent elements of the device, etc. For instance, both the upper and lower bag parts 14a, 14b may be a roll form or a bellows form.

In the aforesaid embodiment, the blowoff holes 42 of the diffuser 18 are provided only at the frontward side of the vehicle relative to the partition wall 40, but they may be provided at the rearward side of the vehicle relative to the partition wall 40 if only gas is blown off preferentially from the frontward side. In that case, it is preferred that the blowoff holes 42 of the diffuser 18 be provided so that a total opening area is larger at the frontward side than the rearward side of the vehicle relative to the partition wall 40.

In the following an airbag device 50 relating to a second embodiment of this invention will be described with reference to FIGS. 5 to 8.

The airbag device 50 is also an airbag device for assistant driver's seat, as is the case with the first embodiment, and like elements indicated in like numerals have the same constructions as those of the first embodiment unless otherwise stated and therefore the description will be omitted.

In this embodiment, a first sidewall 12a and a second sidewall 12b of the casing 12 opposed to each other in the width direction of the vehicle are formed with circular openings 52, 54, respectively, of nearly the same size.

The inflator 16 is provided at one axial end with the gas blowoff part 28 having a smaller diameter relative to the cylinder body and the gas blowoff part 28 has at its top surface the bolt 17 projecting. The gas blow-off part 28 is provided at its periphery with a plurality of blowoff holes 29. At the axial other end side, a circular flange 58 closing the opening 54 of the second sidewall 12b is provided.

Figure 5:
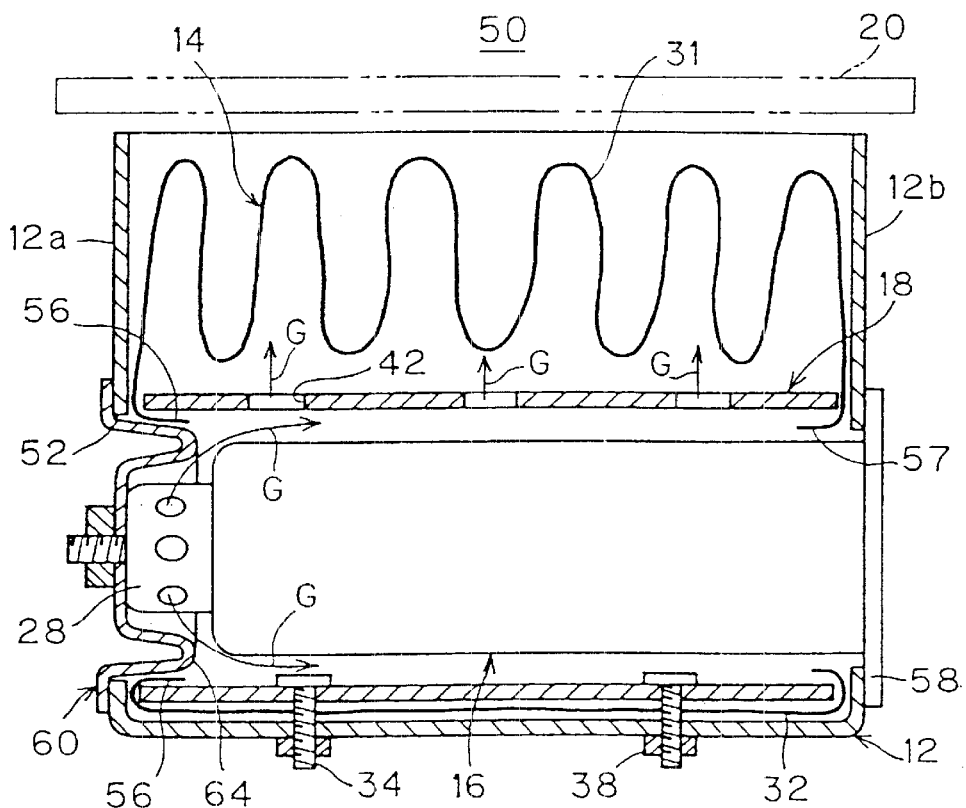
FIG. 5 is a longitudinal sectional view of an airbag device relating to a second embodiment of this invention.

The airbag 14 are provided at both lateral sides of the lip portion 32 with corresponding openings 56, 57 to the first and the second sidewalls 12a, 12b, respectively of the casing 12. As shown in FIG. 5, both ends of the inflator 16 are adapted to be secured to the sidewalls 12a, 12b by projecting from the openings 56, 57 outwardly.

The diffuser 18 is locked to the bottom surface of the casing 12 between the first and second sidewalls 12a, 12b of the casing 12 by fastening of the locking bolts 34 and the nuts 38 as described above. Besides marginal portions around the openings 56, 57 defined at the lip portion 32 of the airbag 14 are pinched in clearances between the sidewalls 12a, 12b of the casing 12 and the edge surfaces of the diffuser 18 thereby minimizing the gas leakage from the clearances, as apparent from FIG. 5.

The reference numeral 60 designates a circular cap made of metal for closing the opening 52 defined on the first sidewall 12a of the casing 12. The cap 60 is provided at its central part with a through-hole 62, through which the bolt 17 of the inflator 16 is inserted and fastened with the nut 30, whereby the inflator 16 is fixed, at its one end on the gas blowoff part 28 side, to the first sidewall 12a through the cap 60 and, at its other end on the flange 58 side, to the second sidewall 12b.

The cap 60 is provided with a gas-restraining wall 64 projecting between the gas blowoff part 28 of the inflator 16 and the diffuser 18 to cover the outer periphery of the gas blowoff part 28. The gas-restraining wall 28 covers the gas blowoff part 28 at a clearance to the peripheral surface thereof so that the gas is blown out from the peripheral surface.

In this embodiment, the gas-restraining wall 64 is formed in a ring shape so as to cover the entire periphery of the gas blowoff part 28. The gas-restraining wall 64 is formed integrally with the cap 60 by drawing forming and assumes a generally U-form in section so as to project inwardly of the diffuser 18. Otherwise the gas-restraining wall 64 projects to cover the gas blowoff part 28 in its axial nearly entirety. More particularly, the top of the gas-restraining wall 64 projects beyond the gas blowoff holes 29 inboards so as to cover completely the gas blowoff holes 29 in the axial direction.

Figure 6:
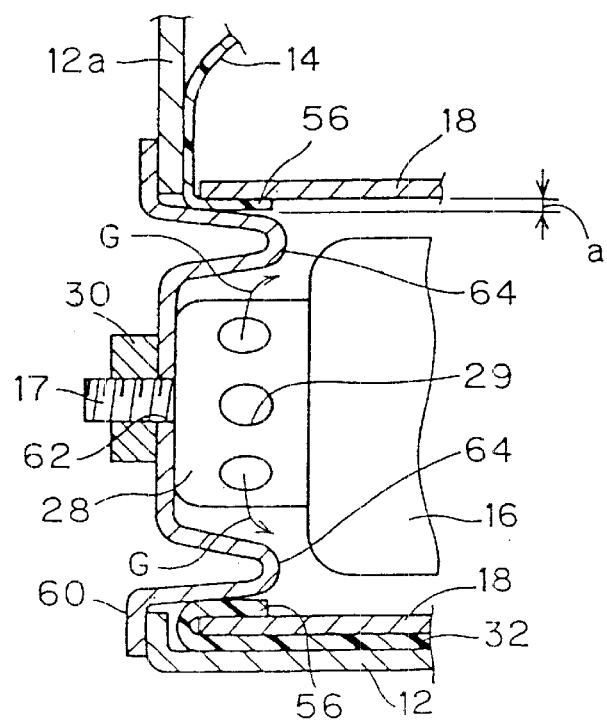
FIG. 6 is an enlarged view of FIG. 5 showing its essential parts.

As illustrated in FIG. 6, a clearance a between the gas-restraining wall 64 and the diffuser 18 is set to be nearly the same level as the thickness of the marginal opening portion 56 of the airbag 14 (e.g., 0.5 to 2.0 mm) and the marginal opening portion 56 of the airbag 14 is pinched at the clearance a.

Figure 7:
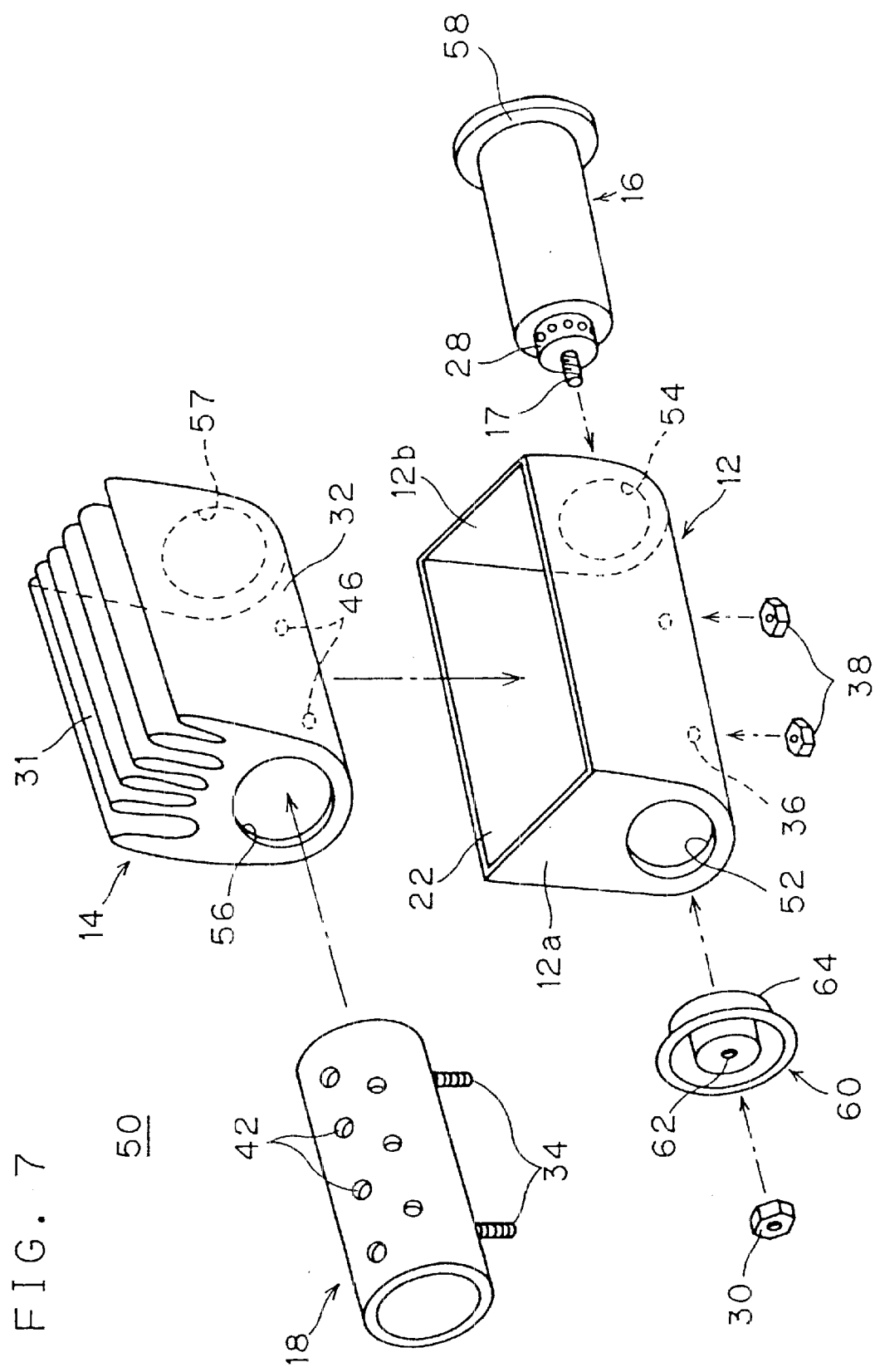
FIG. 7 is an exploded perspective view of the aforementioned airbag device.

In assembling the airbag device 50, as shown in FIG. 7, the airbag 14 is inserted into the casing 12 from the upside opening 22, with the diffuser 18 arranged in the lip portion 32 thereof and the diffuser 18 is locked to the casing 12 with the aid of the bolts 34 and the nuts 38. Then the inflator 16 is loaded from the opening 54 of the second sidewall 12b of the casing 12 and the opening 52 of the first sidewall 12a is covered with the cap 60, which is fastened with the bolt 17 of the inflator 16 and the nut 30.

According to the airbag device 50 of the second embodiment as described above, seeing that the periphery of the gas blowoff part 28 at the one end of the inflator 16 is covered with the ring-form gas-restraining wall 64 projecting from the first sidewall 12a of the casing 12 as shown in FIG. 6, it is possible to prevent the gas G blown out radially outwardly from the peripheral surface of the gas blowoff part 28 from blowing directly to the clearance between the first sidewall 12a of the casing 12 and the edge surface of the diffuser 18. As a result, the gas leakage from the clearance can be prevented.

Furthermore by the provision of the gas-restraining wall 64, it is possible to suppress the deformation of the terminal portion of the diffuser 18 due to the gas pressure blown out radially outwardly from the gas blowoff part 28 and the gas leakage is diminished.

Further, the provision of the gas-restraining wall 64 permits the protection of the marginal opening portion 56 of the airbag 14, which is pinched in the clearance between the first sidewall 12a of the casing 12 and the edge surface of the diffuser 18, from the heat of gas blown out from the gas blowoff part 28.

The gas-restraining wall 64 serves to change the flowing direction of the gas G, as shown in FIG. 5, blown out of the one end of the inflator 16 and to flow it along the axial direction of the inflator 16, so that when the gas passes through the blowoff holes 42 of the diffuser 16, equalized gas flows G in the axial direction of the inflator 16 are obtained.

Figure 8:
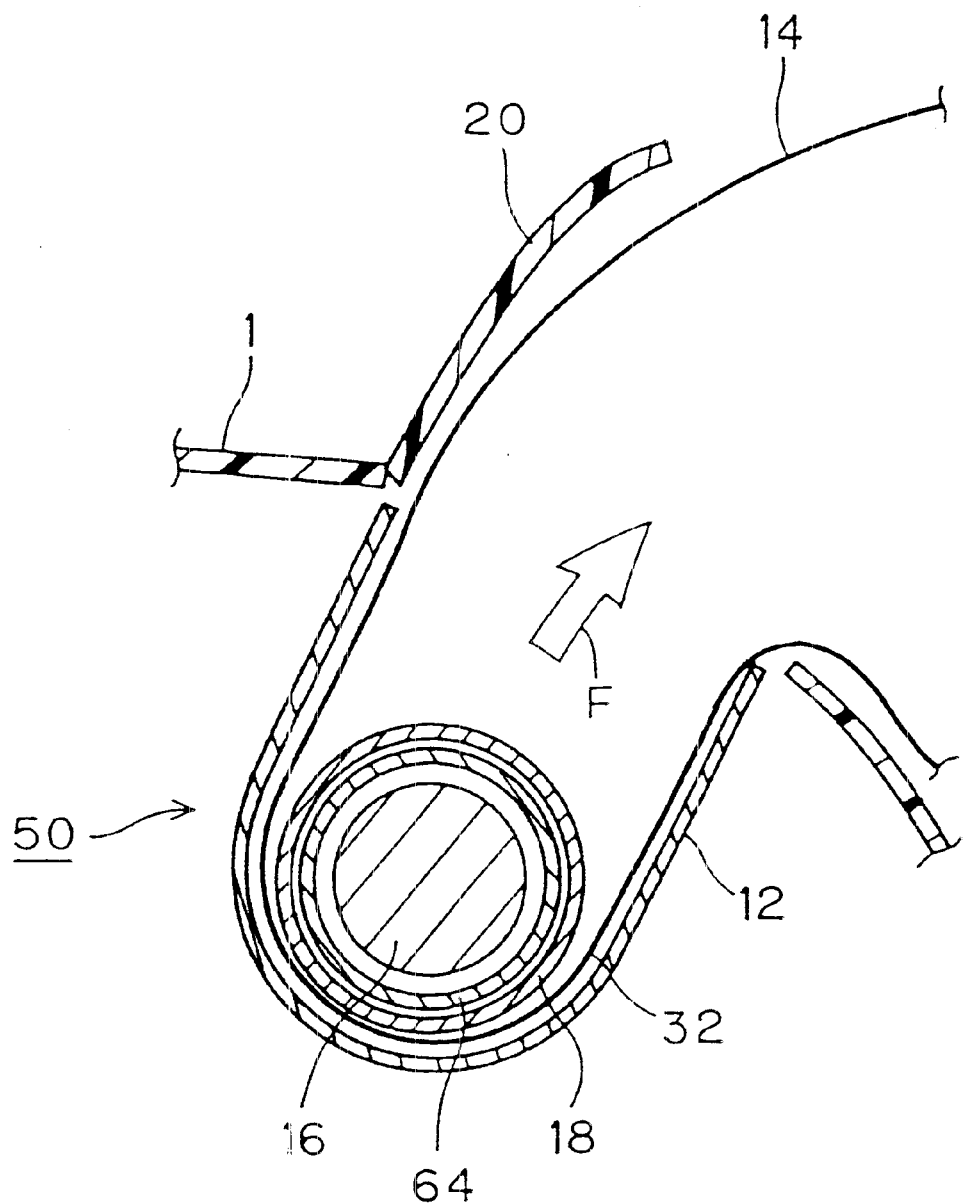
FIG. 8 is a sectional view of the aforementioned airbag device when the airbag is deployed.

Further, when a force that will move in an arrow direction F as shown in FIG. 8 acts on the diffuser 18 by the deployment of the airbag 14, the ring-form gas-restraining wall 64 provided within the diffuser 18 can suppress this movement.

Figure 9:
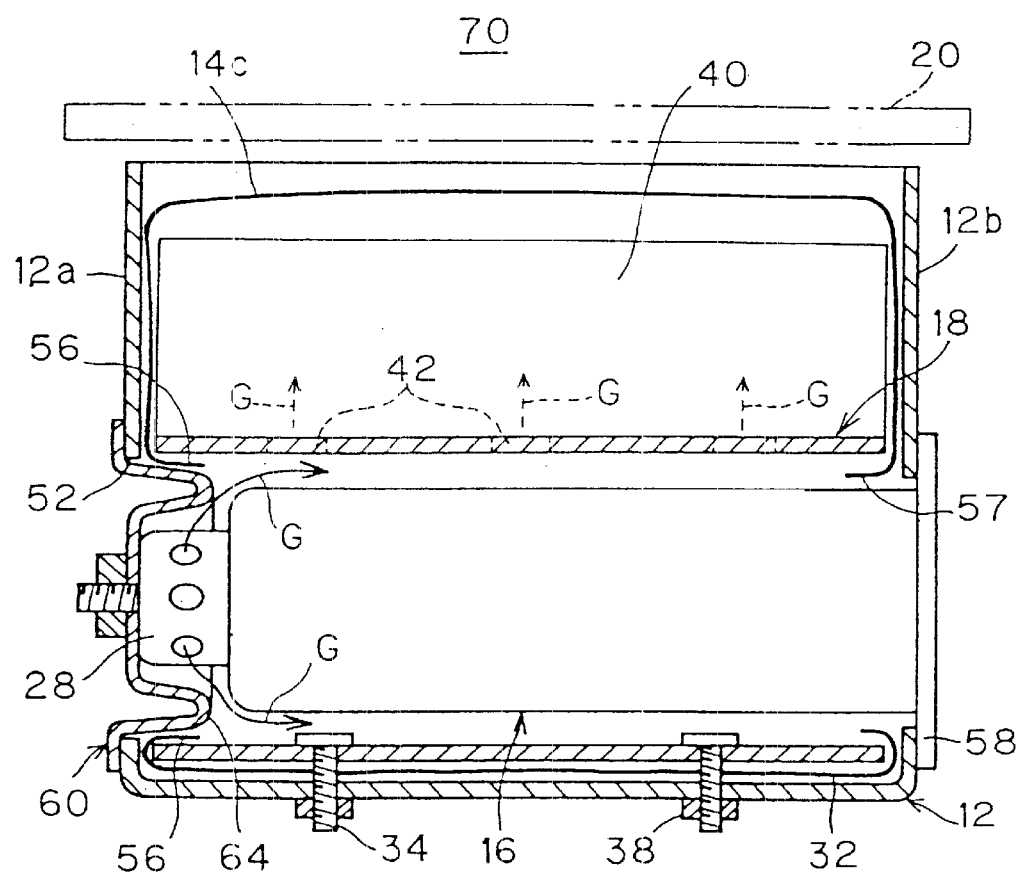
FIG. 9 is a longitudinal sectional view of an airbag device relating to a third embodiment of this invention.

FIG. 9 is a sectional view of an airbag device 70 according to a third embodiment. This airbag device 70 is such that in the airbag device 50 of the second embodiment, the diffuser 18 is provided with the partition wall 40, similarly to the first embodiment, to divide the airbag 14 fore and aft relative to it and to house the folded parts thereof.

Here the gas flows G blown out of the diffuser 18 are equalized in the axial direction of the inflator 16 by the action of the gas-restraining wall 64 and as such a more effective control of the deployment behavior can be performed than the case of the airbag 40 in the first embodiment.

Figure 10:
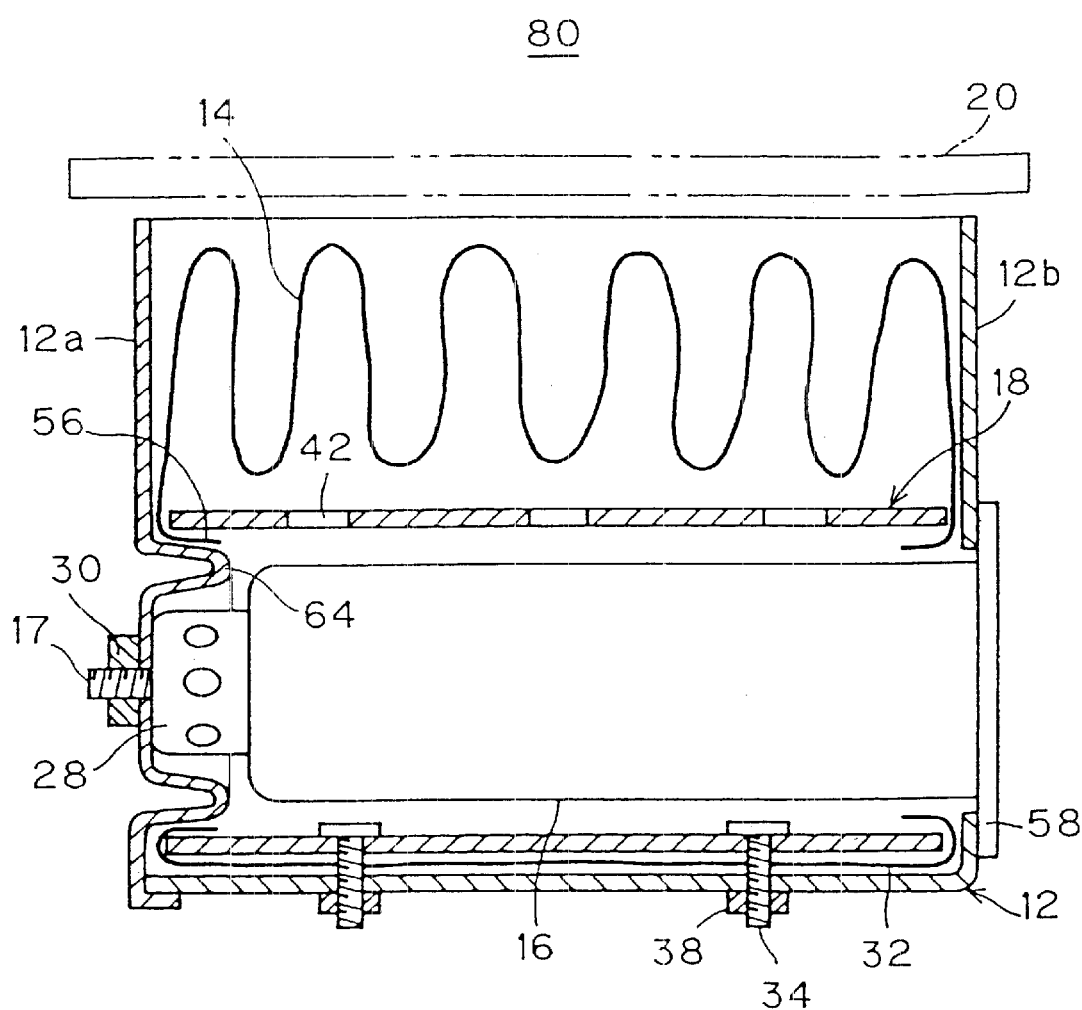
FIG. 10 is a longitudinal sectional view of an airbag device relating to a fourth embodiment of this invention.

FIG. 10 is a sectional view of an airbag device 80 concerned with a fourth embodiment. The airbag device 80 is such that the cap 60 is formed integrally with the first sidewall 12a of the casing 12 thereby providing the gas-restraining wall 64 on the first sidewall 12 per se.

Figure 11:
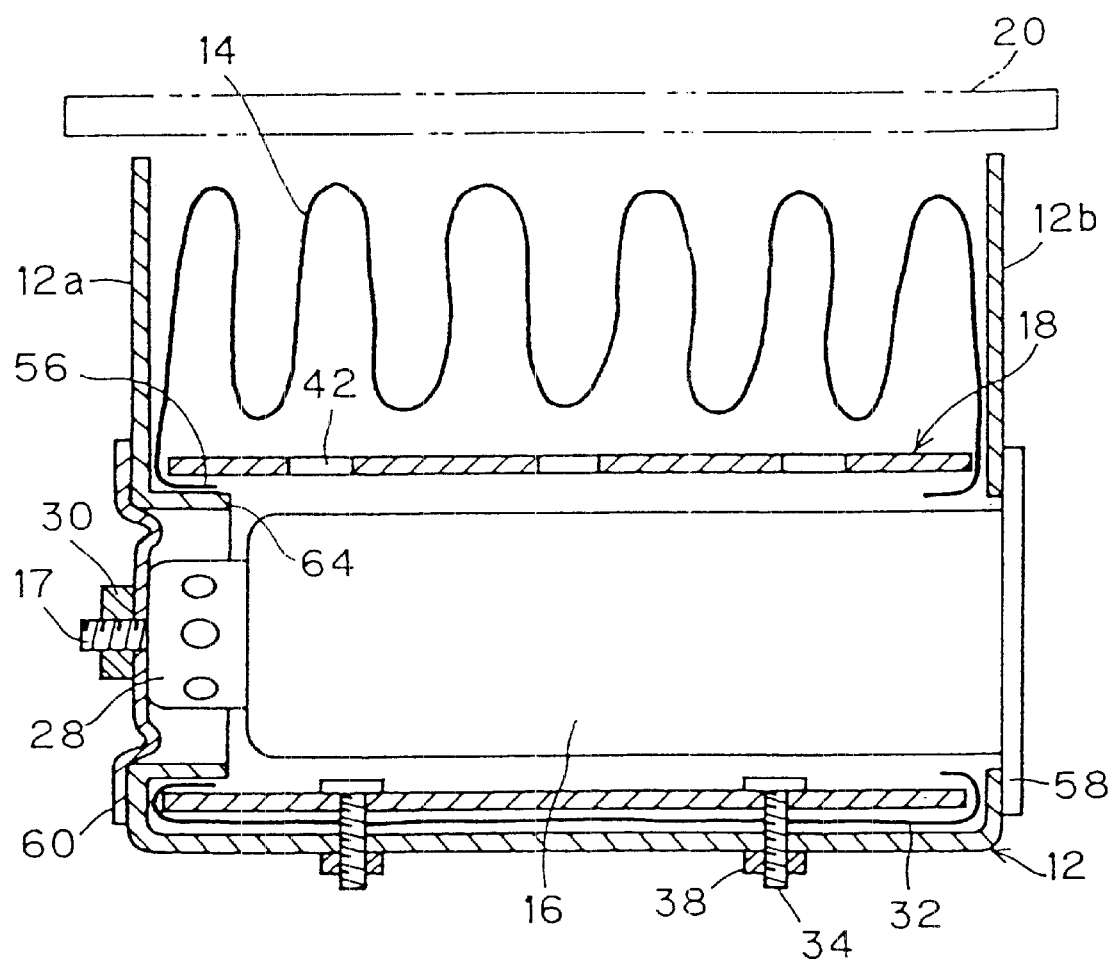
FIG. 11 is a longitudinal sectional view of an airbag device relating to a fifth embodiment of this invention.

FIG. 11 is a sectional view of a further airbag device 90 relating to a fifth embodiment. In this airbag device 90, the gas-restraining wall 64 is formed in a manner that the open edge portion of the first sidewall 12a is subjected to bending working so as to project within the diffuser 18, instead of providing the gas-restraining wall 64 with the cap 60. The gas-restraining wall 64 does not project in a U-form in section as is the case with the second embodiment, but may project simply in a plate form like this.

Figure 12:
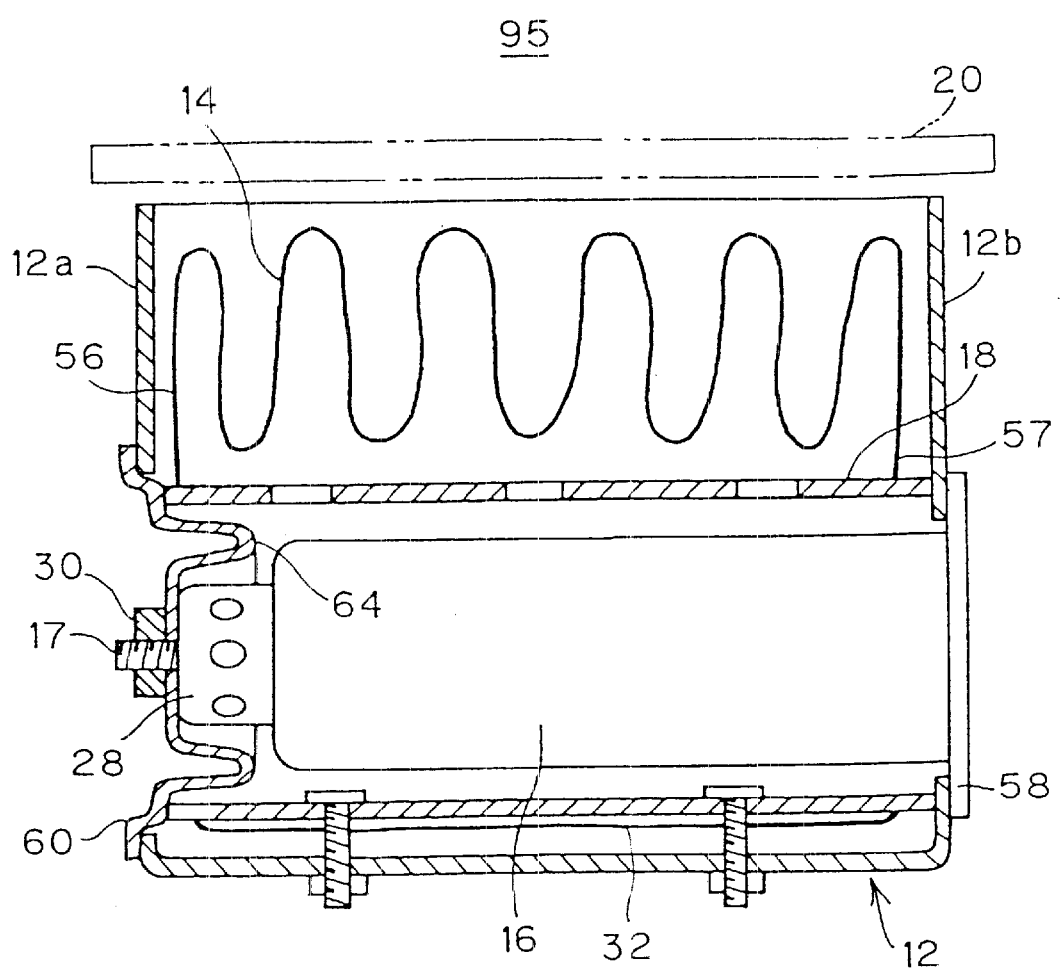
FIG. 12 is a longitudinal sectional view of an airbag device relating to a sixth embodiment of this invention.
Figure 13:
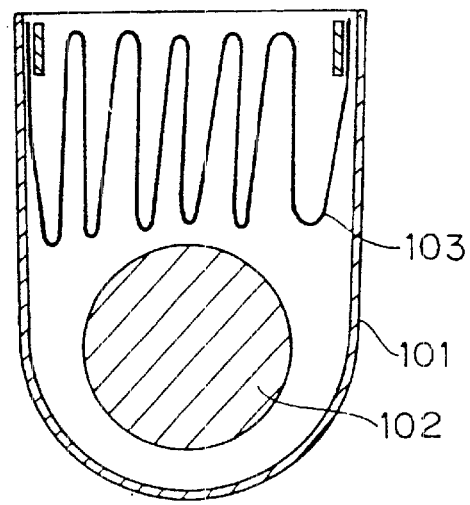
FIG. 13 is a longitudinal sectional view of a conventional airbag device.
Figure 14:
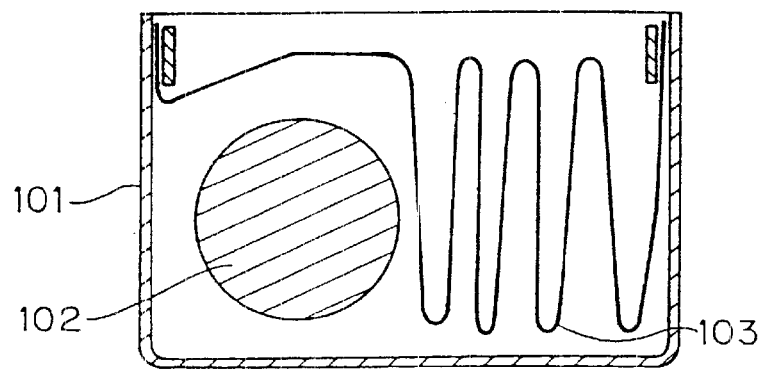
FIG. 14 is a longitudinal sectional view of another conventional airbag device.
Figure 15:
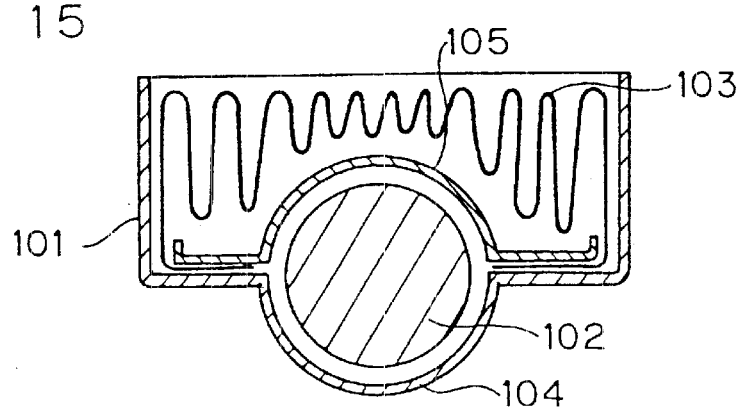
FIG. 15 is a longitudinal sectional view of further conventional airbag device.
Figure 16:
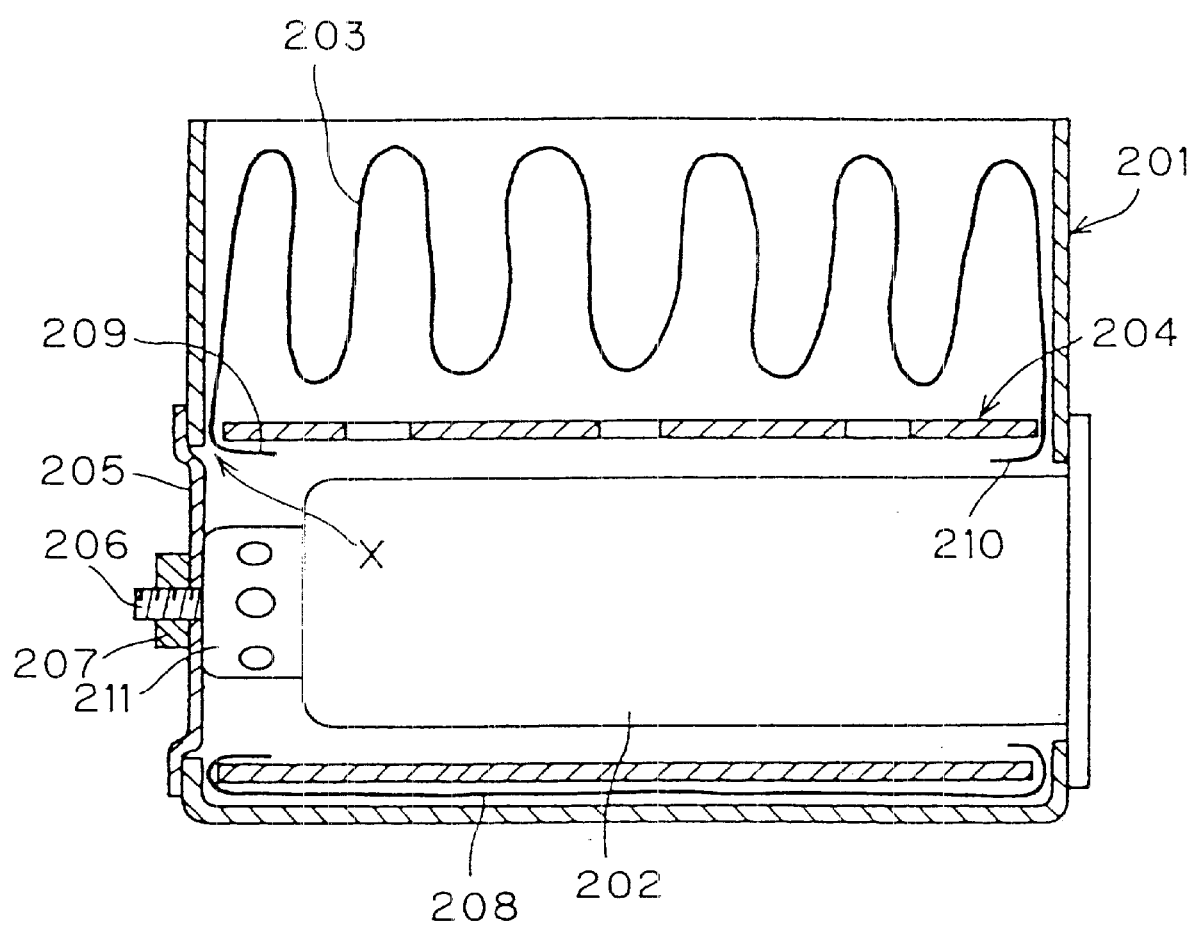
FIG. 16 is a longitudinal sectional view of still another conventional airbag device.
Figure 17:
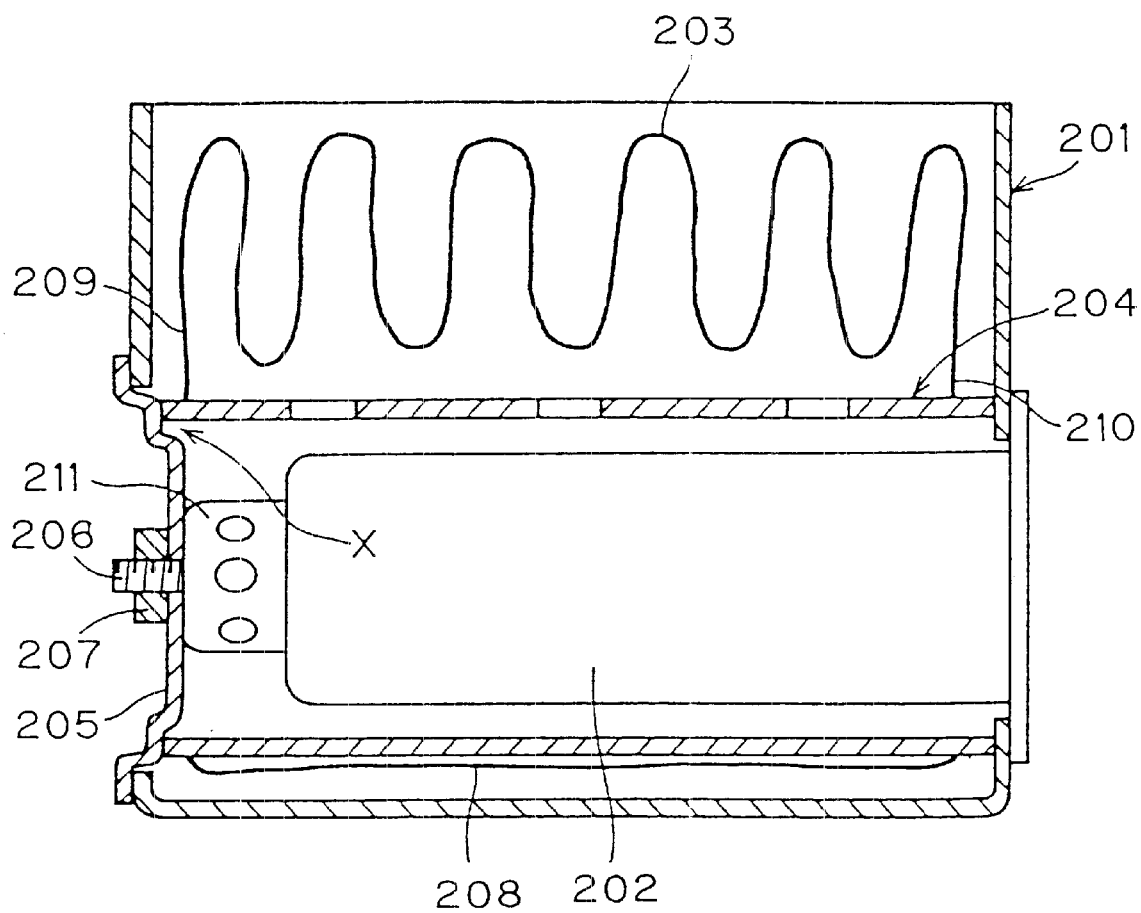
FIG. 17 is a longitudinal sectional view of yet further conventional airbag device.

FIG. 12 is a sectional view of an airbag device 95 relating to a sixth embodiment. In this airbag device 95, the marginal opening portions 56, 57 of the airbag at both lateral sides are not pinched between the diffuser 18 and the sidewalls of the casing 12, but the edge surface of the diffuser 18 is pressed with the cap 60 thereby preventing the leakage of gas from the terminal portion of the diffuser 18. And the cap 60 is provided integrally with the gas-restraining wall 64.

In this case, the deformation at the extremity of the diffuser 18 caused by the gas pressure blown out of the gas blowoff part 28 is suppressed by the gas-restraining wall 64, so that it is unlikely that a clearance emerges between the diffuser 18 and the cap 60. On account of the fact that the deformation at the extremity of the diffuser 18 is suppressed, it is possible to suppress any clearance from being produced between the marginal opening portion 56 of the airbag 14 and the peripheral surface of the diffuser 18. Therefore the leakage of gas is reduced.

INDUSTRIAL APPLICABILITY

According to this invention, first, such an airbag device is provided that is, albeit compact, easy to control the deployment behavior of the airbag and superior in workability of assembling the airbag in the casing.

According to this invention, second, such an airbag device is provided that is able to prevent the gas from the inflator from leaking outside and to obtain advantageous gas flows in controlling the deployment behavior of the airbag.

What is claimed is:

1. An airbag device comprising a casing having an opening side and a bottom side, an inflator assuming a generally columnar form housed in the casing on the bottom side, an airbag folded and housed in the casing at the opening side, and a cylindrical member having on its peripheral surface holes for blowing therethrough gas emitted from the inflator into the airbag, wherein the cylindrical member is provided with a partition wall projecting toward the opening side of the casing and comparting a space housing the airbag therein into two compartments, and the airbag is housed dividedly in the two compartments, the airbag has a lip portion extending to a bottom part of the cylindrical member wherein the cylindrical member is enclosed by the airbag, the bottom part of the cylindrical member is locked to a bottom surface of the casing to form a locked part and the lip portion of the airbag is engaged with the locked part whereby the airbag is fixed to the casing, wherein the inflator is provided at its axial end with a gas blowoff part, the cylindrical member is disposed inside the lip portion of the airbag and disposed between a first sidewall and a second sidewall of the casing opposed to each other, the inflator inserted within the cylindrical member is fixed at one end constituting the gas blowoff part to the first sidewall and at another end opposite to the gas blowoff part to the second sidewall, the gas blowoff part of the inflator is covered with a gas-restraining wall, the gas-restraining wall projecting from the first sidewall between the gas blowoff part and the cylindrical member, and wherein the gas-restraining wall is provided in the entire peripheral area of the gas blowoff part and the gas-restraining wall projects so as to cover more than a half of the gas blowoff part in the axial direction.

2. The airbag device as claimed in claim 1, wherein the cylindrical member is provided at the bottom part with locking projections, the lip portion of the airbag and the bottom surface of the casing are provided with respective through-holes, through which to insert the locking projections, the locking projections of the cylindrical member are inserted into the through-holes of the airbag and further into the through-holes of the casing to engage both, thereby locking the bottom part of the cylindrical member to the bottom surface of the casing.

3. The airbag device as claimed in claim 1 or 2, wherein the casing is open generally upwardly and disposed within an instrument panel of a vehicle so that the axial direction of the inflator is oriented toward the width direction of the vehicle, the space for housing therein the airbag is comparted in fore-and-aft direction relative to the vehicle by the partition wall of the cylindrical member and the airbag is housed in a folded state dividedly in a forward side and a rearward side of the vehicle relative to the partition wall so that the one folded part of an upper bag part of the airbag in a deployed form may be housed in the forward side of the vehicle relative to the partition wall while the other folded part of a lower bag part of the airbag in a deployed form may be housed in the rearward side of the vehicle relative to the partition wall, holes are disposed on a peripheral surface of the cylindrical member so that the opening area of the holes located at the forward side of the vehicle relative to the partition wall is larger than that of the holes located at the rearward side of the vehicle relative to the partition wall.

4. The airbag device as claimed in claim 3, wherein the holes on the peripheral surface of the cylindrical member are disposed only at the forward side of the vehicle relative to the partition wall.

5. The airbag device as claimed in claim 3, wherein the upper bag part of the airbag is folded in a bellows fashion and the lower bag part of the airbag is folded in a roll form.

6. The airbag device as claimed in claim 1, wherein the gas-restraining wall has an inside diameter shorter than an outside diameter of a body of the inflator.

7. An airbag device comprising an airbag, an inflator assuming a generally columnar form and provided with a gas blowoff part at one end of the columnar form, a casing housing therein the airbag and the inflator and having an opening for expanding the airbag out therethrough, and a cylindrical member surrounding an outer periphery of the inflator and having at its circumferential surface holes for blowing gas emitted from the inflator into the airbag, wherein the cylindrical member is disposed inside a lip portion of the airbag and disposed between a first sidewall and a second sidewall of the casing opposed to each other, the inflator placed within the cylindrical member is fixed at its one end constituting a gas blowoff part to the first sidewall and at another end opposite to the gas blowoff part to the second sidewall, the airbag is engaged inside the casing by means of the cylindrical member disposed therein, the gas blowoff part of the inflator is covered with a gas-restraining wall projecting from the first sidewall between the gas blowoff part and the cylindrical member, and wherein the gas-restraining wall is provide in the entire peripheral area of the gas blowoff part and the gas-restraining wall projects so as to cover more than a half of the gas blowoff part in the axial direction.

8. The airbag device as claimed in claim 7, wherein the first sidewall has a circular opening and is provided with a cap closing the opening so that the one end of the inflator may be fixed, and the gas-restraining wall is fitted to the cap.

9. The airbag device as claimed in claim 8, wherein the gas-restraining wall is formed integrally with the cap by drawing.

10. The airbag device as claimed in claim 7, wherein the lip portion of the airbag has openings for securing both ends of the inflator to corresponding sidewalls of the casing, and marginal portions around the openings of the airbag are pinched between the gas-restraining wall and the cylindrical member.

11. The airbag device as claimed in claim 7, wherein the inflator is housed on the bottom part side of the casing and the airbag is housed on the opening side of the casing, the cylindrical member is provided with a partition wall projecting toward the opening side of the casing and comparting a space the airbag is housed into a forward side and a rearward side of a vehicle relative to the partition wall, the airbag being housed dividedly in the forward side and in the rearward side.

12. The airbag device as claimed in claim 7, wherein the gas-restraining wall has an inside diameter shorter than an outside diameter of a body of the inflator.

* * * * *